(12) United States Patent
Ko et al.

(10) Patent No.: US 7,394,836 B2
(45) Date of Patent: Jul. 1, 2008

(54) PACKET SCHEDULING SYSTEM AND METHOD FOR HIGH-SPEED PACKET NETWORKS

(75) Inventors: Nam Seok Ko, Daejeon (KR); Dong Yong Kwak, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 865 days.

(21) Appl. No.: 10/704,354

(22) Filed: Nov. 6, 2003

(65) Prior Publication Data

US 2004/0114602 A1 Jun. 17, 2004

(30) Foreign Application Priority Data

Dec. 13, 2002 (KR) ............... 10-2002-0079730

(51) Int. Cl.
*H04J 3/02* (2006.01)
(52) U.S. Cl. ............... 370/537; 370/412; 370/419; 370/230
(58) Field of Classification Search .......... 370/412, 370/413, 414, 415, 416, 417, 537, 538, 539, 370/540, 514
See application file for complete search history.

(56) References Cited

U.S. PATENT DOCUMENTS

| | | | | |
|---|---|---|---|---|
| 5,850,399 | A | * 12/1998 | Ganmukhi et al. | 370/412 |
| 5,859,835 | A | 1/1999 | Varma et al. | |
| 5,905,730 | A | * 5/1999 | Yang et al. | 370/429 |
| 5,991,812 | A | * 11/1999 | Srinivasan | 709/232 |
| 6,075,791 | A | 6/2000 | Chiussi et al. | |
| 6,081,507 | A | * 6/2000 | Chao et al. | 370/235 |

(Continued)

FOREIGN PATENT DOCUMENTS

JP 2001-519121 10/2001

(Continued)

OTHER PUBLICATIONS

IEEE/ACM Transactions on Networking, vol. 1, No. 3, Jun. 1993, pp. 344-357.

(Continued)

*Primary Examiner*—Hassan Kizou
*Assistant Examiner*—Bo Hui A. Zhu
(74) *Attorney, Agent, or Firm*—Blakely, Sokoloff, Taylor & Zafman LLP

(57) ABSTRACT

Provided are a packet scheduling system and method capable of fair link resource distribution among a plurality of sessions requesting transmissions to an identical output link in input and output interfaces of a node in a high-speed packet exchange network such as an ATM network or the Internet. The packet scheduling system uses a traffic classifier which classifies traffic input from a plurality of input links, for each session; a central management unit which manages the agreed speed for each session and the virtual time of a system; a virtual finish time calculation unit which in response to the agreed speed and the system virtual time, calculates the virtual finish time of each packet for the traffic and attaches the calculated virtual finish time to the head of the packet as a time stamp. A packet queue which stores the packet sent by the virtual finish time calculation unit, for each session; and a packet transmission unit selects and outputs a packet having a shortest virtual finish time among packets stored in the packet queue.

12 Claims, 6 Drawing Sheets

U.S. PATENT DOCUMENTS 6,134,217 A 10/2000 Stiliadis et al.
6,396,843 B1 5/2002 Chiussi et al.

FOREIGN PATENT DOCUMENTS

| JP | 2002-118585 | 4/2002 |
|---|---|---|
| KR | 2001-0000087 | 1/2001 |
| KR | 2001-000000087 | 1/2001 |

OTHER PUBLICATIONS

A Self-Clocked Fair Queueing Scheme for Broadband Applications, pp. 636-646, 1994.

Rate-Proportional Servers: A Design Methodolgy For Fair Queueing Algorithms, 27 pages, 1998.

Efficient Fair-Queueing Algorithms, 36 pages, 1998.

Minimum-Delay Self-Clocked Fair Queueing Algorithm for Packet-Switched Networks, pp. 1112-1121, 1998.

Efficient Fair-Queueing Algorithms for Packet-Switched Networks, 12 pages, 1998.

Service Disciplines for Guaranteed Performance Service in Packet-Switching Networks, pp. 1-23, 1995.

* cited by examiner

PACKET SCHEDULING SYSTEM AND METHOD FOR HIGH-SPEED PACKET NETWORKS

This application claims priority from Korean Patent Application No. 2002-79730, filed on Dec. 13, 2002, the disclosure of which is incorporated herein by reference in their entirety.

BACKGROUND OF THE INVENTION

1. Field of the Invention

The present invention relates to a packet scheduling system and method, and more particularly, to a packet scheduling system and method capable of fair link resource distribution among a plurality of sessions requesting transmissions to an identical output link in input and output interfaces of a node, such as an asynchronous transfer mode (ATM) switch or a router, in a high-speed packet exchange network such as an ATM network or the Internet.

2. Description of the Related Art

Generally, packet scheduling algorithms are broken down into two methods according to operation modes of a server: one is a work-conserving method, by which the server provides services continuously unless there are no waiting packets in a queue, and the other is a non work-conserving method by which the server does not provide services and maintains a waiting state if predetermined conditions are not satisfied even though there is a packet waiting for services in a queue. In the latter method, though there is a waiting packet the server does not provide services such that the utilization efficiency of the server is relatively low but performance requirements determined in advance, such as a delay bound or a delay jitter limit, can be accurately guaranteed. Meanwhile, in the former method, the utilization efficiency of the server is higher but a minimum performance for each session should be guaranteed irrespective of the operations of other sessions and a mechanism capable of fair distribution of a contract speed for each session and the like for a plurality of requests to use idle resources of the server should be considered.

A theory underlying the work-conserving method is a generalized processor sharing (GPS) algorithm disclosed in an article by Abhay K. Parekh and Robert G. Gallager, "A generalized processor sharing approach to flow control in integrated services networks: The single node case" vol. 1, pp. 344-357, IEEE/ACM Transactions on Networking, June 1993. The article provides a hypothetical theory in which all input traffic is modeled as a flow of fluid and a server is used as a scheduling system that provides services at the same time to all links requesting services so that idealistic fairness and optimal delay bound values are provided. However, since the minimum unit of traffic is a packet in an actual packet network environment and a server can transmit only one packet at a time, it is impossible to actually implement the system suggested in the article and the article is only providing conceptual performance criteria which all process scheduling algorithms aim at.

As one of the algorithms that are implemented in actual network environments, closest to the concept of the GPS algorithm described above, there is a weighted fair queueing (WFQ) which assumes that a basic unit of ingress traffic is a packet. The WFQ algorithm introduces a concept of virtual time for displaying the operation state of a GPS server because the operation of the GPS server should be imitated as if traffic modeled as the flow of fluid are all serviced at the same time. A system virtual time is updated with the amount of work performed in the GPS server in each event occurring on the GPS system, such as arrival of a new packet or departure of a packet being serviced. The updated virtual finish time is used as a time stamp of a packet. This algorithm can provide performance close to the GPS algorithm, but in the worst case, while one packet is being transmitted, new packets from all links may arrive such that calculation and update of the virtual time may be repeated with the same frequency as the number of the links. Accordingly, it is actually difficult to implement the algorithm in a high-speed network environment requiring high-speed determination of transmission order of packets.

In a scheduling algorithm which was suggested to improve the WFQ algorithm with this complexity-to-implement problem, there is a self clocked fair queueing (SCFQ) algorithm. Unlike the WFQ algorithm, this algorithm does not have the continuous GPS simulation step and when a new packet arrives, it regards the time stamp of the packet as a virtual time. As a result, packets which arrived during one transmission share an identical virtual time such that the complexity due to calculation of the virtual time can be greatly reduced. However, in the worst case, when an arbitrary packet arrives, all session can have the time as the time stamp being serviced such that the packet which is newly arrived has to wait until packets of all sessions are transmitted, irrespective of complying with traffic rules. In this case, the waiting time is proportionate to the number of linked sessions. Thus, the SCFQ algorithm improves the complexity due to calculation of the virtual time but degrades the delay bound that can be guaranteed, compared to the WFQ algorithm.

As a method to solve the drawback of the SCFQ algorithm, there is a starting potential fair queueing (SPFQ) algorithm. In the SPFQ algorithm, whenever transmission of a packet finishes, the virtual time is reset to the smallest value among the virtual start time values of packets in the head of each queue. The SPFQ algorithm has an advantage of maintaining good performance but has a disadvantage of an arrangement process for the virtual start time which is additionally needed.

As a method to improve the calculation complexity of the WFQ algorithm with an approach similar to that of the SCFQ algorithm, there is a minimum-delay self-clocked fair queueing (MD-SCFQ) algorithm. As the SCFQ algorithm, the MD-SCFQ algorithm does not have a separate step for simulation of the GPS, and calculates the system virtual time by using information on the front packet waiting in a queue so that it can reduce the complexity of calculation compared to the WFQ algorithm and improve the delay characteristic compared to the SCFQ algorithm. However, this algorithm has a disadvantage of overhead for continuously collecting and managing information on packets waiting in a queue at a time when the system virtual time is calculated.

Thus, the work-conserving type scheduling algorithms have different methods for calculating and maintaining virtual time functions and time stamps for respective systems. In a scheduling system for a high-speed network environment, the most important performance parameter is the simplicity of a system related to high-speed determination of a transmission order. When this is considered, it can be said that the closer to the GPS, a scheduling system can maintain the fairness and delay characteristics that are basic requirements of a work-conserving scheduling system while maintaining this simplicity, the better the scheduling system is. Therefore, a new packet scheduling system and method are needed in which the delay bound and fairness index of the WFQ level can be guaranteed in a switch or a router in a high-speed packet exchange network and the calculation complexity O(1) of the system virtual time can be maintained.

SUMMARY OF THE INVENTION

The present invention provides a packet scheduling system and method by which the delay bound and fairness index of the WFQ level can be guaranteed in a switch or a router in a high-speed packet exchange network and the calculation complexity O(1) of the system virtual time can be maintained.

The present invention also provides a packet scheduling system and method by which when the transmission order of packets is determined a fair and optimal delay bound can be provided.

The present invention also provides a computer readable recording medium having embodied thereon a computer program for the packet scheduling method.

According to an aspect of the present invention, there is provided a packet scheduling system comprising: a traffic classifier which classifies traffic input from a plurality of input links, for each session; a central management unit which manages the agreed speed for each session and the virtual time of a system; a virtual finish time calculation unit which in response to the agreed speed and the system virtual time, calculates the virtual finish time of each packet for the traffic and attaches the calculated virtual finish time to the head of the packet as a time stamp; a packet queue which stores the packet sent by the virtual finish time calculation unit, for each session; and a packet transmission unit which selects and outputs a packet having a shortest virtual finish time among packets stored in the packet queue.

According to another aspect of the present invention, there is provided a packet scheduling method comprising: (a) classifying traffic input from a plurality of input links for each session; (b) in response to an agreed speed for each session and the virtual time of a system provided by a central management unit, calculating the virtual finish time of each packet for the traffic and attaching the calculated virtual finish time to the header of the packet as a time stamp; (c) storing the packet, to which the virtual finish time is attached, in a packet queue for each session; and (d) selecting a packet having a shortest virtual finish time among packets stored in the packet queue and outputting the packet.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
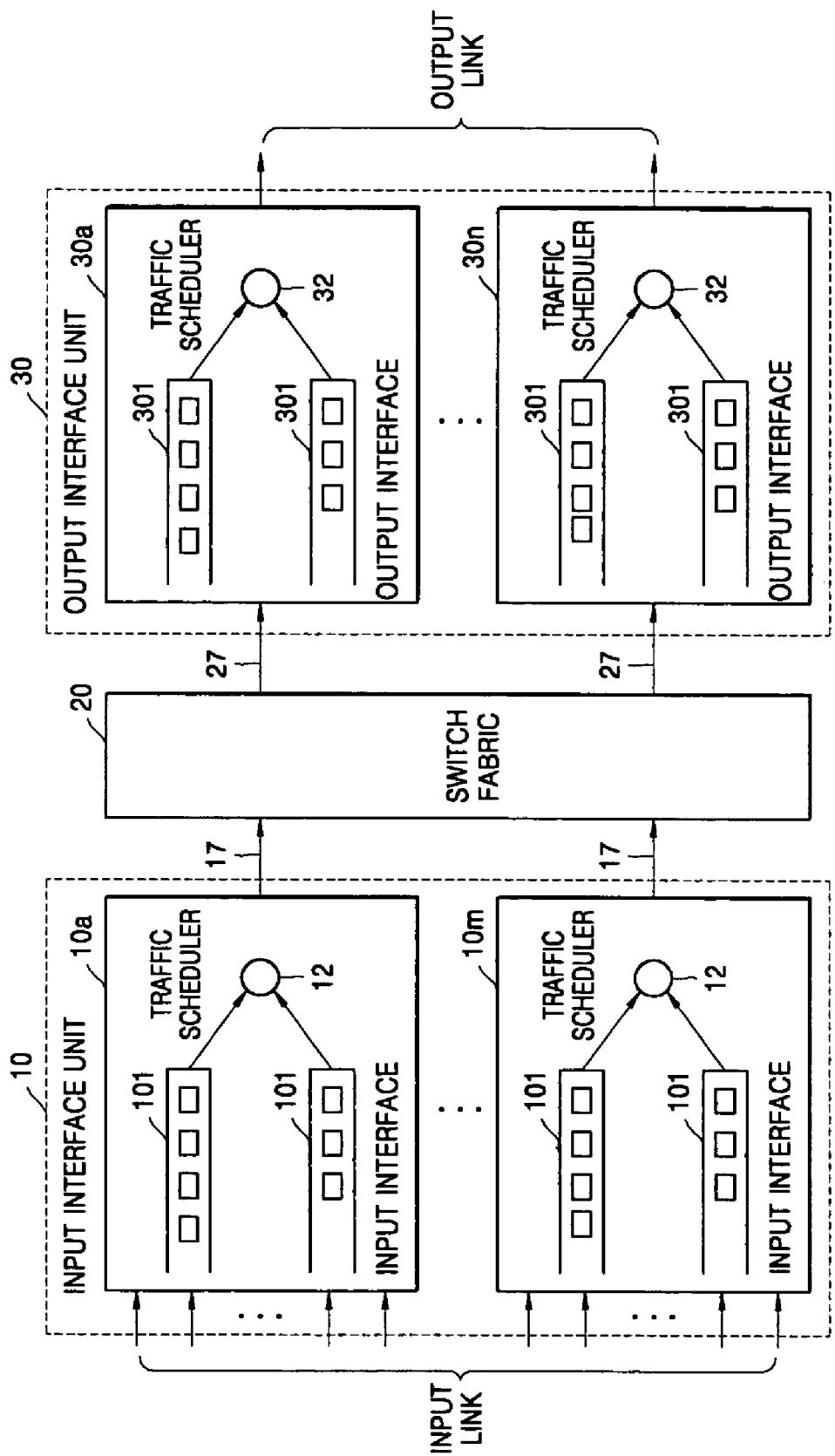
FIG. 1 is a block diagram of a basic structure of a high-speed packet exchange node having a packet scheduling system according to the present invention.

FIG. 1 shows a basic structure of a high-speed packet exchange node (for example, an ATM switch, a router system, etc.) which schedules packets entering from a plurality of input links at arbitrary speeds and sequentially multiplexes and transmits the scheduled packets in a high-speed packet exchange network to which the present invention is applied, such as an ATM or the Internet. The packet scheduling system according to the present invention is disposed at an input interface unit 10 and/or an output interface unit 30 of a high-speed packet exchange node.

Referring to FIG. 1, the high-speed packet exchange node comprises broadly an input interface unit 10, a switch fabric 20, and an output interface unit 30. The input interface unit 10 has m input interfaces (10a-10m) and the output interface unit 30 has n output interfaces (30a-30n).

Each input interface (10a-10m) installed in the input interface 10 performs the packet scheduling according to the present invention for traffic input from a plurality of input links and sends the scheduling result to the switch fabric 20 through the input port 17 of the switch fabric 20.

The switch fabric 20 switches the input traffic provided from the input interface unit 10 and then sends the input traffic to the output interface unit 30 through the output port 27. Each output interface (30a-30n) installed in the output interface 30 receives the traffic provided through the switch fabric 20, performs packet scheduling according to the present invention, and outputs the result to the output link.

Figure 2:
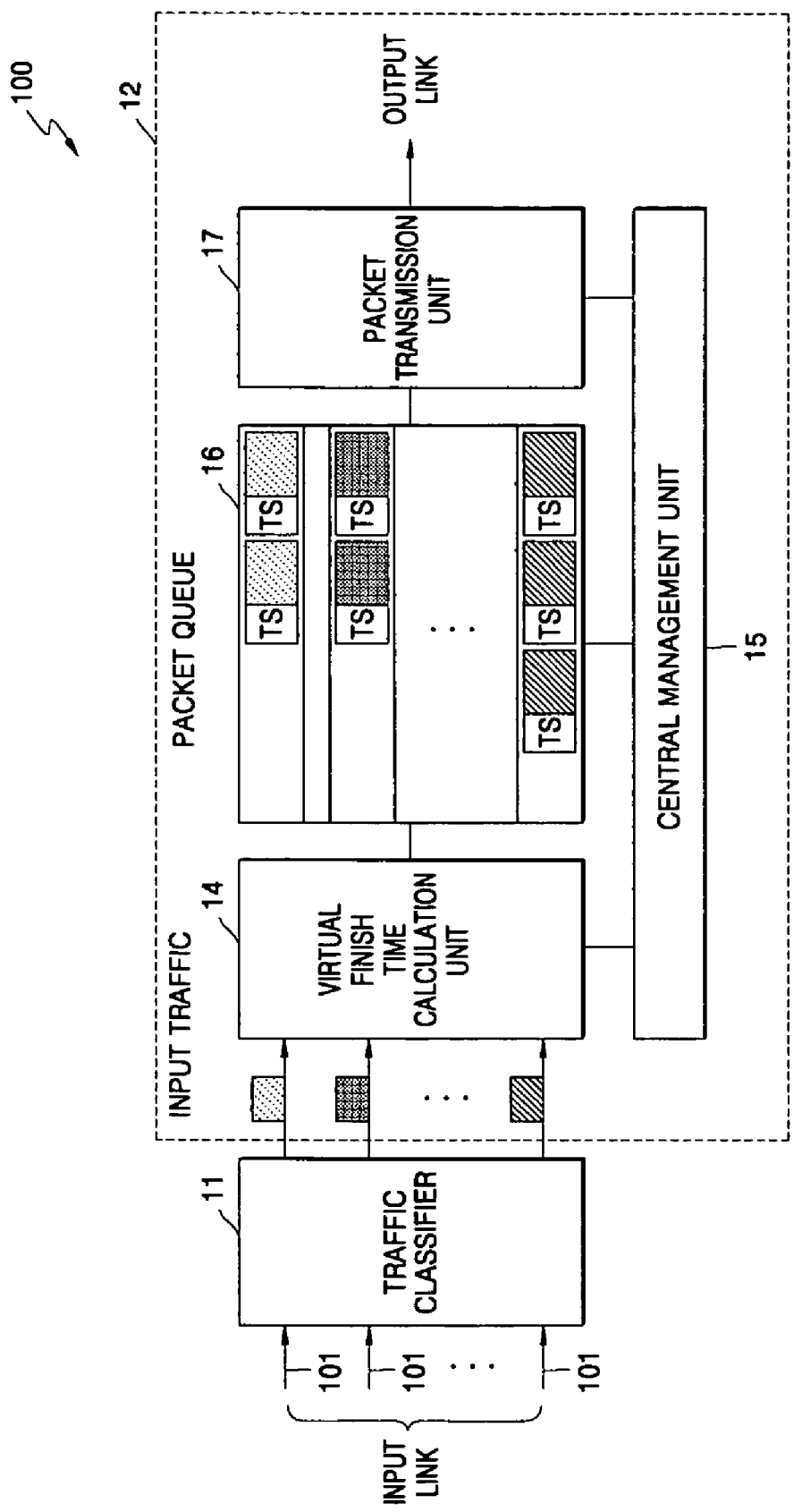
FIG. 2 is a detailed block diagram of a packet scheduling system according to the present invention, built in an input interface shown in FIG. 1.

FIG. 2 is a detailed block diagram of a packet scheduling system 100 according to the present invention, built in the input interface 10a shown in FIG. 1. Referring to FIG. 2, the packet scheduling system 100 according to the present invention comprises a traffic classifier 11 and a traffic scheduler 12. The traffic scheduler 12 comprises a virtual finish time calculation unit 14, a central management unit 15, a packet queue 16, and a packet transmission unit 17.

The traffic classifier 11 performs multiple field-based traffic classification for the traffic input from the plurality of input links 101. The virtual finish time calculation unit 14 of the traffic scheduler 12 calculates the virtual finish time for each packet for the classified traffic and attaches the calculated virtual finish time to the head of each packet as a time stamp. The packet queue 16 stores the packets, in which each header has an attached virtual finish time, for each session. The packet transmission unit 17 performs actual transmission of packets. The central management unit 15 is connected to the finish time calculation unit 14, the packet queue 16, and the packet transmission unit 17 and manages the agreed speed for each session, the virtual time of the system and the like.

Each session of the traffic input from the input link 101 is classified by the traffic classifier 11. If the fields of the packet used for traffic classification correspond to a 3-layered protocol as the Internet protocol, sessions are classified based on multiple fields including the source address of an IP, the destination address, the protocol fields, and the port number. For ATM, sessions are classified based on the virtual path identifier (VPI) and virtual channel identifier (VCI) values, and for multiprotocol label switching (MPLS), sessions are classified based on the label value of an MPLS header.

The traffic classified into each session is input to the virtual finish time calculation unit 14. The virtual finish time calculation unit 14 calculates a virtual finish time for each packet based on the system virtual time managed by the central management unit 15 and the virtual finish time of the previous packet of the corresponding session and stores the calculated result in a packet queue 16 for the corresponding session. The packet transmission unit 17 first selects a packet having a shortest virtual finish time in each session among the packets stored in the packet queue 16 and sends to the output link.

The detailed operations performed in the virtual finish time calculation unit 14 an the packet transmission unit 17 after the traffic input from each input link is classified for each session through the traffic classifier 11 will now be explained.

Figure 3:
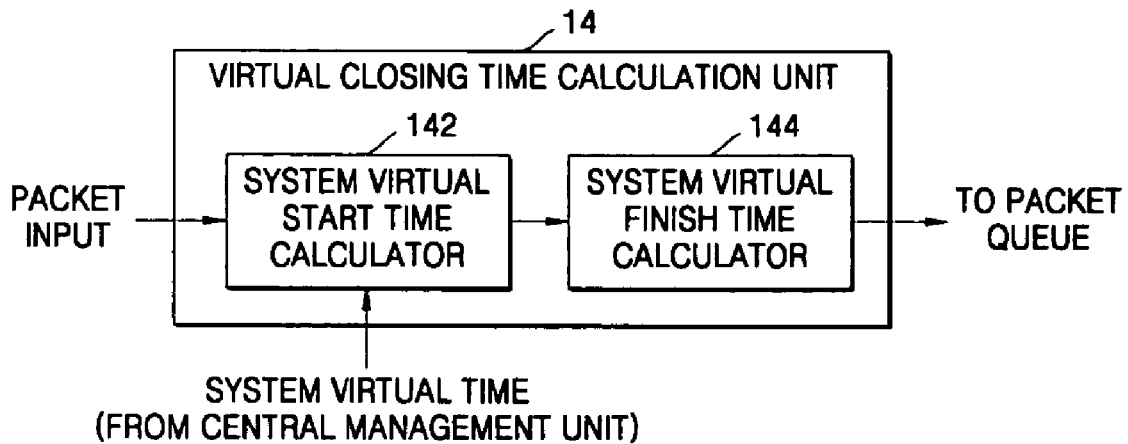
FIG. 3 is a detailed block diagram of a virtual finish time calculation unit shown in FIG. 2.

FIG. 3 is a detailed block diagram of a virtual finish time calculation unit 14 shown in FIG. 2. Referring to FIG. 3, the virtual finish time calculation unit 14 comprises a system virtual start time calculator 142 and a system virtual finish time calculator 144.

The system virtual start time calculator 142 fetches the agreed speed for a session and the system virtual time from the central management unit 15. The bigger value between the virtual finish time of a packet which belongs to a session, to which the current packet belongs, and arrived previous to the current packet, and the system virtual time at a current time is determined as the system virtual start time by the system virtual start time calculator 142. The system virtual finish time calculator 144 calculates the system virtual finish time, based on the virtual start time calculated by the virtual start time calculator 142, the speed of a session to which the packet belongs, and the length of the packet.

Figure 4:
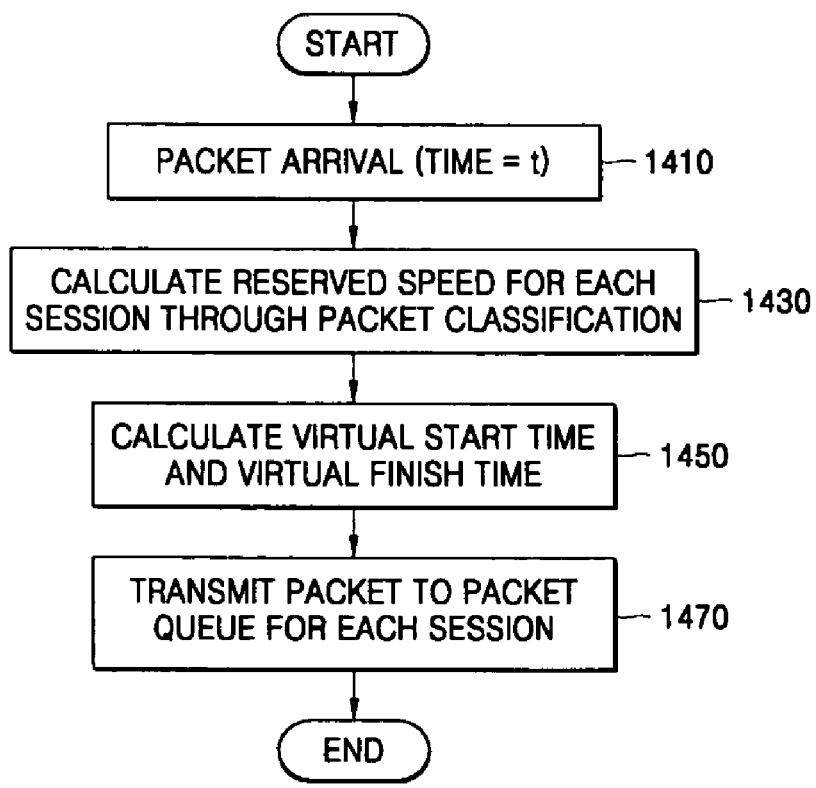
FIG. 4 is a flowchart for a process of calculating a system virtual start time and a system virtual finish time performed in the virtual finish time calculation unit shown in FIG. 3 when a new packet arrives.

FIG. 4 is a flowchart for a process of calculating a system virtual start time and a system virtual finish time performed in the virtual finish time calculation unit 14 shown in FIG. 3 when a new packet arrives. Referring to FIG. 4, if a new packet arrives at time t in step 1410, the virtual finish time calculation unit 14 classifies sessions, to which each packet belongs, through packet classification, and calculates a reserved speed of each classified session in step 1430. Then, based on the system virtual time ($\upsilon(\tau_j)$) input from the central management unit 15 and the length of the previous packet, the virtual start time ($S_i^k$) and the virtual finish time ($F_i^k$) for the current packet (for example, the k-th packet) are calculated in step 1450. Then, the virtual finish time ($F_i^k$) calculated in the step 1450 is attached to the header of each packet as a time stamp and the packet is transmitted to the packet queue 16 of each session in step 1470.

Figure 5:
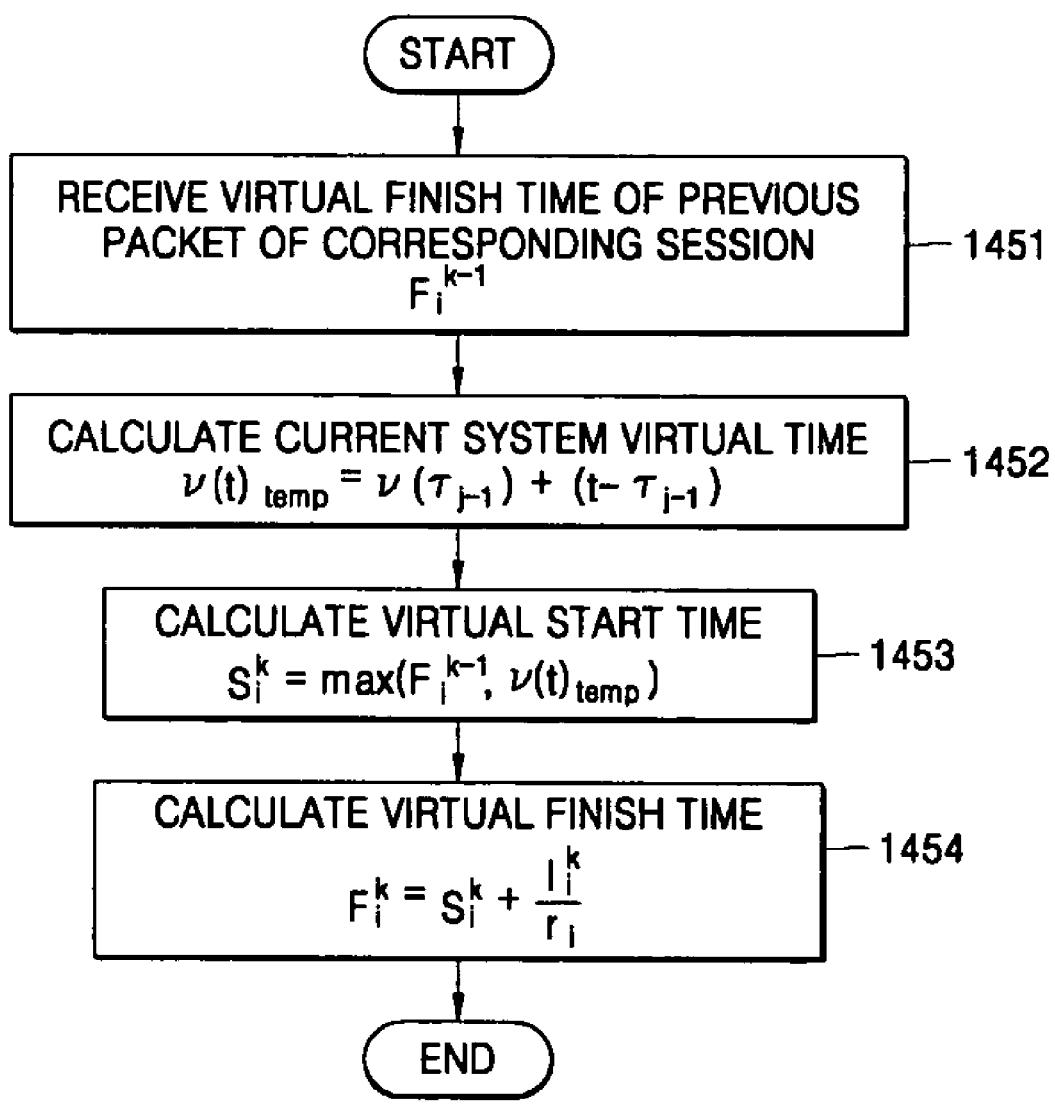
FIG. 5 is a detailed flowchart of calculating a virtual start time ($S_i^k$) and a virtual finish time ($F_i^k$) performed in step 1450 shown in FIG. 4.

FIG. 5 is a detailed flowchart of calculating a virtual start time ($S_i^k$) and a virtual finish time ($F_i^k$) performed in the step 1450 shown in FIG. 4. Referring to FIG. 5, if a packet arrives at time t, the virtual finish time ($F_i^{k-1}$) of the previous packet (that is, the (k-1)-th packet) of the corresponding session is fetched in step 1451. Then, by adding the system virtual time ($\upsilon(\tau_j)$) updated at the service start time of the packet being currently serviced (that is, the service finish time of the immediately previous packet; $\tau_{j-1}$) to the lapse time ($t-\tau_{j-1}$) from time $\tau_{j-1}$ to the current time t, the system virtual time ($\upsilon(\tau)_{temp}$) for an arrival moment (that is, time t) of a new packet is calculated in step 1452. The system virtual time ($\upsilon(\tau)_{temp}$) calculated at this time is as the following equation 1:

$$\upsilon(t)_{temp} = \upsilon(\tau_{j-1}) + (t-\tau_{j-1}) \quad (1)$$

Then, the system virtual start time calculation unit 142 of the virtual finish time calculation unit 14 compares the system virtual time value ($\upsilon(\tau)_{temp}$) calculated by the equation 1 with the virtual finish time ($F_i^{k-1}$) of the previous packet, and sets the virtual start time ($S_i^k$) of the packet to the bigger one of the two values in step 1453. This can be expressed as the following equation 2:

$$S_i^k = \max(F_i^{k-1}, \upsilon(t)_{temp}) \quad (2)$$

If the virtual start time ($S_i^k$) is calculated according to the equation 2, the system virtual finish time calculation unit 144 of the virtual finish time calculation unit 14 calculates the virtual finish time ($F_i^k$) as the following equation 3, by using the virtual start time ($S_i^k$) calculated in the step 1453, the length of the packet ($l_i^k$), and the session speed ($r_i$) of the session corresponding to the packet in step 1454:

$$F_i^k = S_i^k + \frac{l_i^k}{r_i} \quad (3)$$

If the virtual finish time ($F_i^k$) is calculated according to the equation 3, the virtual finish time calculation unit 14 attaches the calculated virtual finish time ($F_i^k$) to the header of each packet as a time stamp and transmits the packet to the packet queue 16 of each session (Refer to the step 1470 of FIG. 4).

As described above, if the transmission of a packet being currently transmitted is completed, the packet transmission unit selects and outputs a packet to be transmitted next time, at a time when the transmission of the packet is completed, and readjusts the system virtual time. The detailed structure and operations for this will now be explained.

Figure 6:
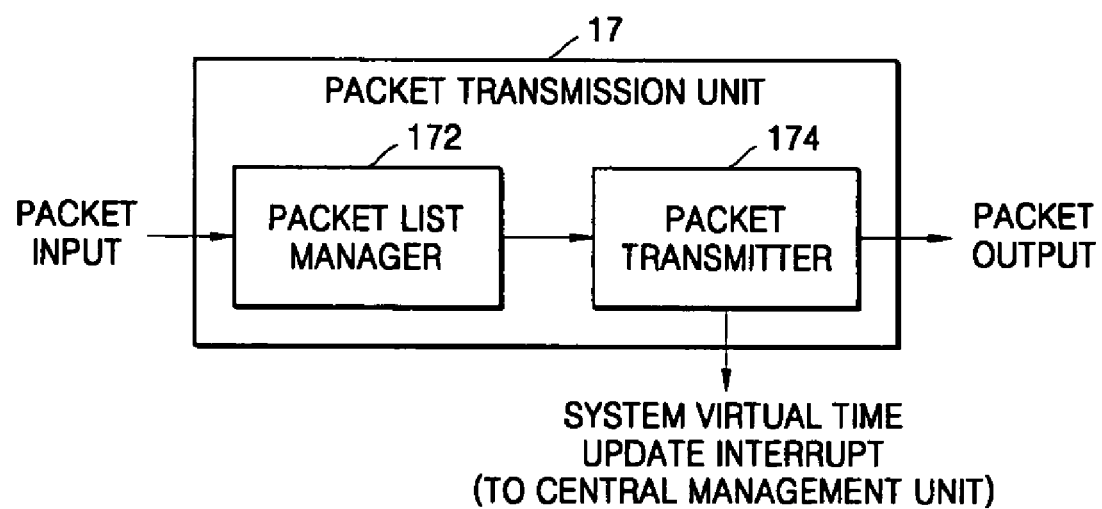
FIG. 6 is a detailed block diagram of a packet transmission unit shown in FIG. 2.

FIG. 6 is a detailed block diagram of a packet transmission unit 17 shown in FIG. 2. Referring to FIG. 6, the packet transmission unit 17 comprises a packet list manager 172 and a packet transmitter 174.

The packet list manager 172 manages a packet list stored in the packet queue 16, based on the virtual finish time of a packet calculated by the virtual finish time calculation unit 14. The packet transmitter 174 selects a packet having the shortest virtual finish time in the packet list managed by the packet list manager 172, and outputs the packet to the output link, and then sends a system virtual time update interrupt so that the system virtual time can be readjusted.

Figure 7:
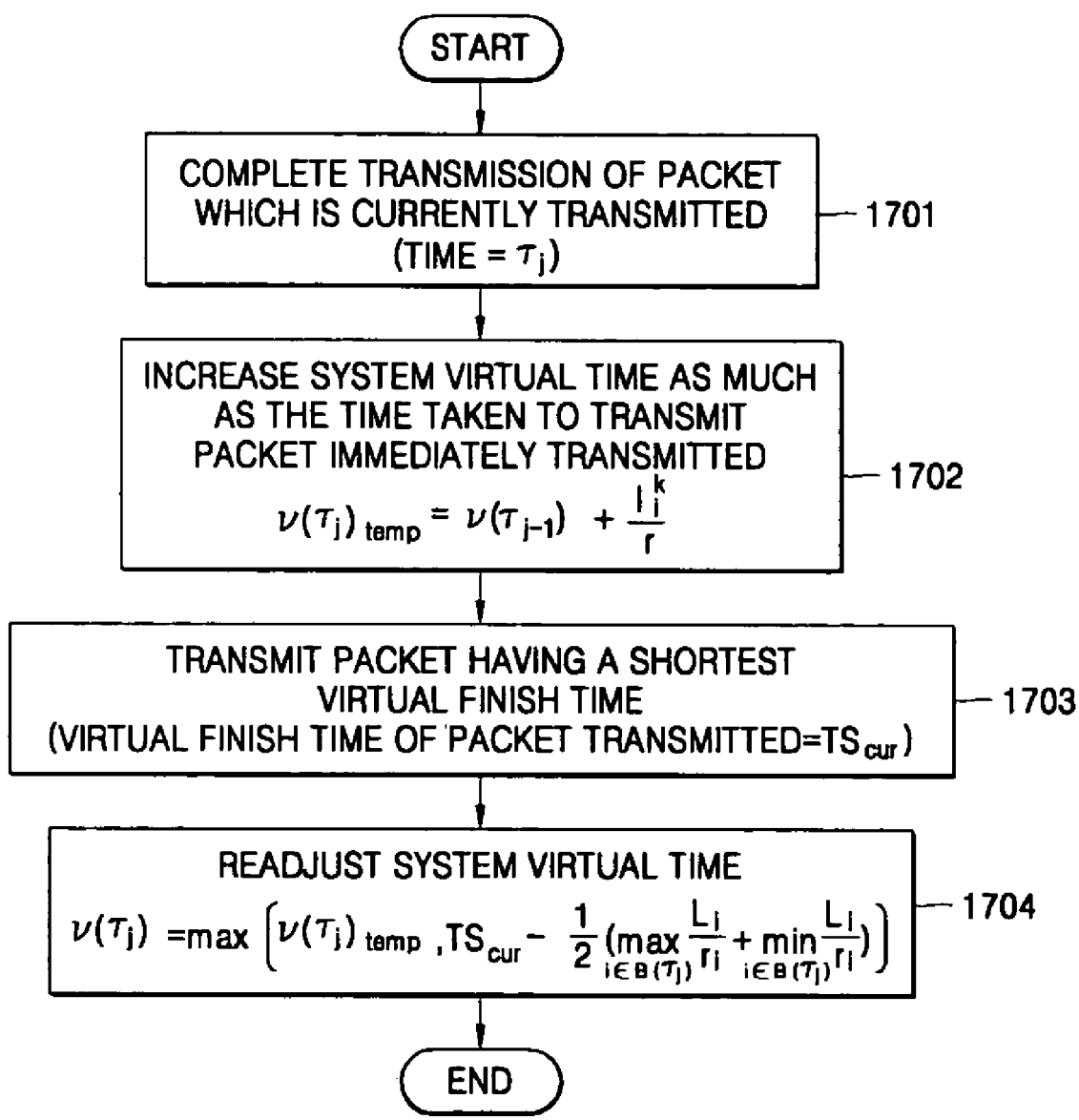
FIG. 7 is a flowchart for a process of transmitting a packet performed in a packet transmission unit shown in FIG. 6.

FIG. 7 is a flowchart for a process of transmitting a packet performed in the packet transmission unit shown 17 in FIG. 6. Referring to FIG. 7, if the transmission of the packet being currently transmitted is completed (time=$\tau_j$) in step 1701, the system virtual time ($\upsilon(\tau)_{temp}$) at a moment (time=$\tau_j$) when the transmission of the packet being currently transmitted is completed is obtained in step 1702 as the following equation 4, by adding the time $$\left(\frac{l_i^k}{r}\right)$$

actually taken to transmit the packet, to the system virtual time ($\upsilon(\tau_{j-1})$) at a time ($\tau_{j-1}$) when transmission of the previous packet is completed:

$$\upsilon(\tau_j)_{temp} = \upsilon(\tau_{j-1}) + \frac{l_i^k}{r} \quad (4)$$

Then, the packet transmission unit 17 selects a packet having the shortest virtual finish time among packets stored in the packet queue 16 and transmits the packet in step 1703. When it is assumed that the virtual finish time of this packet is $TS_{cur}$, the operation for readjusting the system virtual time is performed as the following equation 5 in step 1704:

$$\upsilon(\tau_j) = \max\left\{\upsilon(\tau_j)_{temp}, TS_{cur} - \frac{1}{2}\left(i \in \overset{max}{B}(\tau_j)\frac{l_i^k}{r_i} + i \in \overset{min}{B}(\tau_j)\frac{l_i^k}{r_i}\right)\right\} \quad (5)$$

Here, $L_i$ denotes the maximum size of a packet in session i, and $B(\tau_j)$ denotes a set of sessions having packets to be transmitted at time $\tau_j$.

As described above, according to the packet scheduling method of the present invention, an identical time stamp for packets which newly arrive while a packet is being transmitted is calculated based on an identical criterion. As a result, the complexity due to calculation of the system virtual time is improved to the value of O(1). This can be said that the complexity is improved by N times when compared with the WFQ packet scheduling system in which update of the system virtual time (that is, the virtual time) is depending on the number (N) of sessions and is expressed as O(N).

However, the existing SCFQ packet scheduling system also has the complexity of O(1) because all packets which arrive while one packet is processed calculate their time stamps based on the time stamp (that is, the system virtual time) of the packet being currently serviced. However, in the SCFQ packet scheduling system, though the complexity is improved, the scheduling system has a characteristic that the maximum value of the delay occurring between the arrival of an arbitrary packet to the transmission of the packet depends on the number of sessions. Accordingly, it is difficult to apply the scheduling system to a node having a large volume of ingress traffic. In addition, the SPFQ packet scheduling system has a drawback that the arranged order is maintained by the virtual start time and as a result the complexity of calculation becomes O(log N).

Meanwhile, the MD-SCFQ packet scheduling system reduces the complexity of calculation of the virtual time and improves the performance of the delay and fairness index, but still has a drawback that additional complexity for calculation of the virtual time exists.

Accordingly, the packet scheduling system and method according to the present invention improve the conventional packet scheduling systems with the problems described above such that while the complexity of O(1) is maintained, the maximum delay limit as the WFQ packet scheduling system level can be guaranteed and the fairness index value corresponding to that of the WFQ packet scheduling system is provided. Therefore, the packet scheduling system and method according to the present invention has advantages that it can be applied to a high-speed packet exchange node, and that it can be applied to fixed-sized packets such as ATM packets as well as to the variable-sized packets for the Internet.

The present invention may be embodied in a code, which can be read by a computer, on a computer readable recording medium. The computer readable recording medium includes all kinds of recording apparatuses on which computer readable data are stored. The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet). Also, the computer readable recording media can be scattered on computer systems connected through a network and can store and execute a computer readable code in a distributed mode.

The packet scheduling system and method according to the present invention as described above can guarantee the delay bound and fairness index as the WFG level in a switch or a router on a high-speed packet exchange network, and can maintain the complexity of O(1) of calculation of the system virtual time. Accordingly, when the transmission order of packets is determined, a fair and optimal delay bound can be provided.

What is claimed is:

1. A packet scheduling system comprising:
   a traffic classifier which classifies traffic input from a plurality of input links, for each session;
   a central management unit which manages a predetermined speed for each session and a virtual time of a system;
   a virtual finish time calculation unit which in response to the agreed speed and the system virtual time, calculates the virtual finish time of each packet for the traffic and associates the calculated virtual finish time to each packet as a time stamp;
   a packet queue which stores each packet sent by the virtual finish time calculation unit, for each session; and
   a packet transmission unit which selects and outputs a packet having a shortest virtual finish time among packets stored in the packet queue, wherein when it is assumed that the virtual finish time of the packet is $TS_{cur}$, the system virtual time at time $\tau_j$ is $\upsilon(\tau_j)_{temp}$ when the transmission of the packet being currently transmitted is completed, the speed of a session i to which the packet belongs is $r_i$, the maximum length of a packet in the session i is $l_i$, the time taken to transmit the packet in the session i is $l_i^k/r_i$, and a set of sessions having a packet to be transmitted at time $\tau_j$ is $B(\tau_j)$, the system virtual time is readjusted in response to the virtual time update interrupt, as a value of:

$$\upsilon(\tau_j) = \max\left\{\upsilon(\tau_j)_{temp}, TS_{cur} - \frac{1}{2}\left(i \in \overset{max}{B}(\tau_j)\frac{l_i^k}{r_i} + i \in \overset{min}{B}(\tau_j)\frac{l_i^k}{r_i}\right)\right\}.$$

2. The packet scheduling system of claim 1, wherein the virtual finish time calculation unit comprises:
   a system virtual start time calculator which determines a bigger value between the virtual finish time of a packet which belongs to a session to which the current packet belongs and arrives previous to the current packet and the system virtual time of a current time, as a system virtual start time; and
   a system virtual finish time calculator which calculates a system virtual finish time in response to the system virtual start time calculated by the virtual start time calculator, the speed of the session to which the packet belongs, and the length of the packet.

3. The packet scheduling system of claim 1, wherein if the transmission of a packet being currently transmitted is completed, the system virtual time is calculated by adding a time taken when the current packet is actually transmitted at an output link speed, to the system virtual time at a time when the transmission of a previous packet is completed.

4. The packet scheduling system of claim 2, wherein when it is assumed that the system virtual start time is $S_i^k$, the speed of the session to which the packet belongs is $r^i$, and the length of the packet is $l_i^k$, the system virtual finish time $F_i^k$ is:

$$F_i^k = S_i^k + \frac{l_i^k}{r_i}.$$

5. The packet scheduling system of claim 1, wherein the packet transmission unit comprises:
   a packet list manager which manages a packet list stored in the packet queue based on the virtual finish time for each packet; and
   a packet transmitter which selects a packet having a shortest virtual finish time among packets in the packet list, outputs the selected packet to an output link, and generates a system virtual time update interrupt to the central management unit.

6. The packet scheduling system of claim 1, wherein the packet scheduling system is disposed any one of an input interface and an output interface of a high-speed packet exchange network node including an asynchronous transfer mode (ATM) switch and a router.

7. A packet scheduling method comprising:
   (a) classifying traffic input from a plurality of input links for each session;
   (b) in response to an agreed speed for each session and the virtual time of a system provided by a central management unit, calculating the virtual finish time of each packet for the traffic and attaching the calculated virtual finish time to the header of the packet as a time stamp;
   (c) storing the packet, to which the virtual finish time is attached, in a packet queue for each session; and
   (d) selecting a packet having a shortest virtual finish time among packets stored in the packet queue and outputting the selected packet, when it is assumed that the virtual finish time of the packet is $TS_{cur}$, the system virtual time at time $\tau_j$ is $\upsilon(\tau_j)_{temp}$ when the transmission of the packet being currently transmitted is completed, the speed of a session i to which the packet belongs is $r_i$, the maximum length of a packet in the session i is $l_i$, the time taken to transmit the packet in the session i is $l_i^k/r_i$, and a set of sessions having a packet to be transmitted at time $\tau_j$ is $B(\tau_j)$, the system virtual time is readjusted in response to the virtual time update interrupt, as a value of:

$$\upsilon(\tau_j) = \max\left\{\upsilon(\tau_j)_{temp}, TS_{cur} - \frac{1}{2}\left(\overset{\max}{i \in B}(\tau_j)\frac{l_i^k}{r_i} + \overset{\min}{i \in B}(\tau_j)\frac{l_i^k}{r_i}\right)\right\}.$$

8. The packet scheduling method of claim 7, wherein the step (b) comprises:
   (b-1) determining a bigger value between the virtual finish time of a packet which belongs to a session to which the current packet belongs and arrives previous to the current packet and the system virtual time of a current time, as a system virtual start time; and (b-2) calculating a system virtual finish time in response to the system virtual start time, the speed of the session to which the packet belongs, and the length of the packet.

9. The packet scheduling method of claim 7, wherein if the transmission of a packet being currently transmitted is completed, the system virtual time is calculated by adding a time taken when the current packet is actually transmitted at an output link speed, to the system virtual time at a time when the transmission of a previous packet is completed.

10. The packet scheduling method of claim 8, wherein when it is assumed that the system virtual start time is $S_i^k$, the speed of the session to which the packet belongs is $r_i$, and the length of the packet is $l_i^k$, the system virtual finish time $F_i^k$ is:

$$F_i^k = S_i^k + \frac{l_i^k}{r_i}.$$

11. The packet scheduling method of claim 7, wherein the step (d) comprises:
   (d-1) managing a packet list stored in the packet queue based on the virtual finish time for each packet; and
   (d-2) selecting a packet having a shortest virtual finish time among packets in the packet list, outputting the selected packet to an output link, and readjusting the system virtual time.

12. A computer readable medium having embodied thereon a computer program for the method of claim 7.

* * * * *